Feb. 22, 1949.  W. ROSENTHAL  2,462,556
DROPPING FUNNEL
Filed Aug. 21, 1947
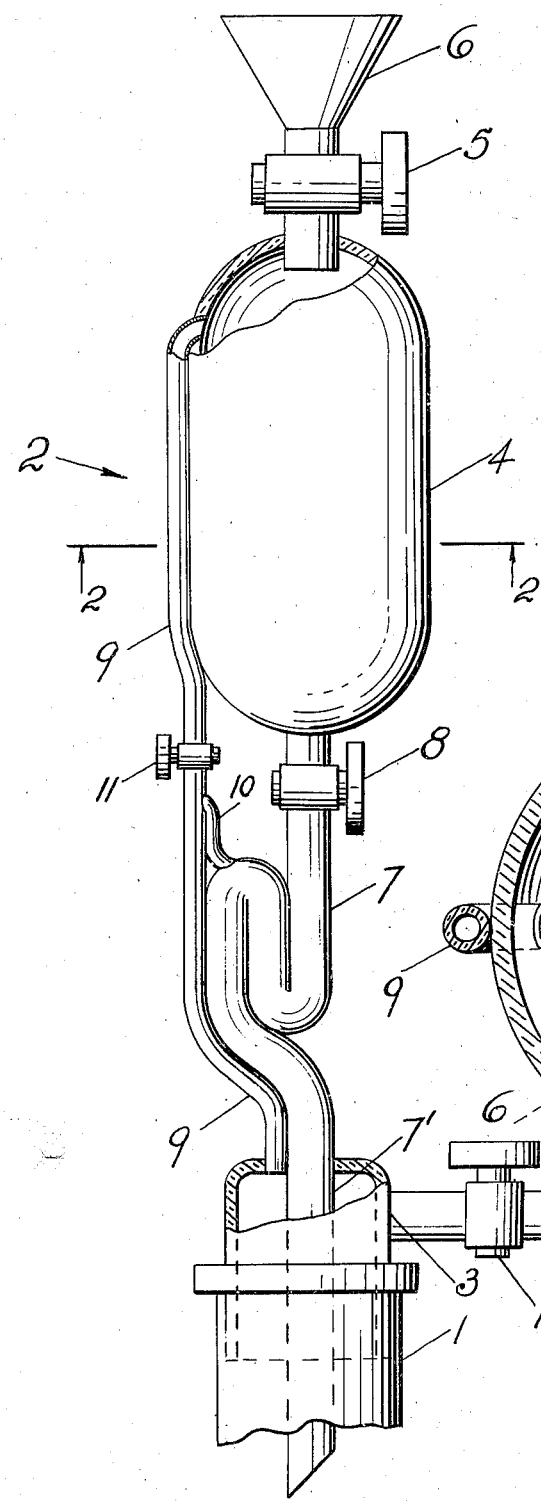
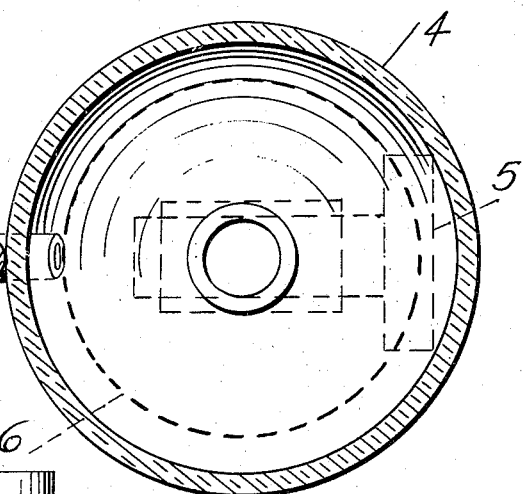
FIG. 1
FIG. 2
INVENTOR
WALTER ROSENTHAL
BY
ATTORNEY Patented Feb. 22, 1949

2,462,556

UNITED STATES PATENT OFFICE 2,462,556

DROPPING FUNNEL

Walter Rosenthal, New York, N. Y.

Application August 21, 1947, Serial No. 769,805

1 Claim. (Cl. 23—252)

My invention relates to a chemical apparatus, preferably useable in laboratory work, adapted to perform and control special chemical reactions.

More particularly the invention relates to improvements in dropping funnels usable for closed-vessel chemical operations, and for dispensing offensive reactors.

Dropping funnels of this kind are supposed to drop continuously measured amounts of reagents into reaction vessels containing certain liquids, reaction mixtures, or the like. Dropping funnels heretofore known do not work at all satisfactorily. They are provided with a glass stopper at the top, and a cock at the bottom spout of the device. In order to permit free flow from the funnel to the reaction vessel, the cock and stopper must be alternately opened and closed. Consequently, air and humidity enter the reaction system, thereby changing the composition and concentration of the reacting liquids or gases. On the other hand, gases or fumes escape from the funnel and from the reaction vessel, thereby interrupting the equilibration of pressure in the funnel chamber above the liquid which is supposed to drop down under its own gravity. By such change of pressure, the dropping of the reagents will no longer be steady and continuous, and it becomes very difficult to conduct and control the process.

It is an object of this invention to provide a gravity feeding device of this kind which makes possible continuous dropping or running of reagents even within an entirely closed system, also avoiding the above mentioned disadvantages if pressure is produced.

Other objects of this invention will in part be obvious and in part are hereinafter pointed out.

The invention accordingly consists of the features of construction, combinations of elements, and arrangement of parts, which will be exemplified in the construction hereinafter described and of which the scope of the application will be indicated in the claim.

In the accompanying drawings, in which is shown one embodiment of my invention

Figure 1 is an elevational view, partly in section, of the new dropping funnel. Fig. 2 is a section through lines 2—2 of Fig. 1, in enlarged scale.

Referring to the drawing, the reference character 1 indicates part of the reaction vessel (only the neck of which is shown). A dropping funnel or feeder 2, air-tightly connected with said reaction vessel by means of a hollow ground glass stopper 3 provided at the bottom of funnel 2, comprises a chamber 4 for the reactor. Said chamber may be graduated (this is not shown in the drawing). Cock 5 provided at the top of said chamber 4 connects the same with the small inlet funnel 6. The outlet of chamber 4 consists of a tube 7 arranged at its bottom and provided with a cock 8. Tube 7 is double-bent and N-shaped. It leads into stopper 3 which connects separator 2 with the reaction vessel 1. A narrow air tube 9 is provided leading from the hollow stopper 3 near where the feeder outlet 7 enters the stopper to the top of the reagent chamber 4. A slender short tube 10 leading from the apex of the N-shaped tube 7 to the air tube 9 forms a connection between the two said tubes.

A cock 11 placed on the air tube 9 above the connecting tube 10 makes it possible to close off entirely the feeder funnel from the reaction vessel.

An outlet 12 closeable by a cock 13 is provided on stopper 3 opposite to air tube 9.

A liquid feeding device of this kind will be operated as follows: At the start cocks 8 and 13 are closed, whereas cocks 5 and 11 are open. An appropriate amount of the reagent is run into the main chamber 4 of the feeding device 2 through the small funnel 6 and cock 5. Cock 5 is then closed. If cock 8 is then opened the reagent will drop into the reaction chamber 1 through the outlet tube 7.

In order to permit continuous dropping of the reagent into said reaction chamber 1, a regulator is provided comprising the double-bent outlet tube 7 arranged at the bottom of chamber 4, the air tube 9 connecting reaction chamber 1 with reaction chamber 4 which carries the reagent, and tube 10 connecting outlet tube 7 with air tube 9. The purpose of this regulator is to equalize the air pressure in chamber 1 and 4, thereby avoiding any unilateral pressure in the system and permitting dropping or running of the feeder's content into the reaction chamber under its own gravity without any interference. The flow of the reagent is regulated only by cock 8.

It is obvious that the equalization of pressure in chambers 1 and 4 is performed by air tube 9. Tube 10 forming a connection between the apex of N-shaped outlet tube 7 with air tube 9 is provided to remove immediately any reagent which passes the bend of outlet 7, thereby avoiding the formation of a column of liquid in the descending part of the outlet tube 7. As in ordinary funnels, such a column would cause great inaccuracy and unsteadiness in dispensing reagents because the column would remain in or leave the outlet tube at liberty, uncontrolled by the operator, causing a succession of shorter or longer shots of reagent instead of an even dropping or flow.

If cock 8 is slightly opened the reagent will be continuously dispensed in the form of drops over the bend of tube 7. If cock 8 is opened wider, an even greater current of reagent may be discharged.

After the end of the use of the device the feeder funnel may be entirely shut up by closing cock 11. If cock 13 is opened the outlet 12 will be useful for letting off pressure or gases, or conducting them to manometers, relief valves, absorption towers, reaction chambers, etc.

It is apparent that the new dropping funnel according to this invention is simple in construction, inexpensive to manufacture, and adapted to avoid the inconveniences connected with the heretofore known devices.

Although the invention has been described in connection with specific details of a preferred embodiment thereof, it must be understood that such details are not intended to be limitative of the invention except as set forth in the accompanying claim; for instance, the use of regulators of different construction from that described.

Having thus described my invention I declare that what I claim is:

A continuous feeder funnel for controlled closed vessel chemical operations in a reactor chamber, comprising a double bend or N-shaped conduit to said reactor chamber arranged at the bottom of the funnel and provided with a valve closure; a bleed line connection between the upper portion of the feeder funnel and the reactor chamber, provided with a valve closure; and a bleed line connection by a second conduit leading from the first bleed line to the upper portion of the N-shaped bend.

WALTER ROSENTHAL.

REFERENCES CITED

The following references are of record in the file of this patent:

UNITED STATES PATENTS

| Number | Name | Date |
|---|---|---|
| 760,072 | Keyes | May 17, 1904 |